United States Patent [19]

Nishiyama

[11] Patent Number: 4,918,302

[45] Date of Patent: Apr. 17, 1990

[54] ARRANGEMENT FOR DETECTING A STATE OF LIGHT OR BRIGHTNESS

[75] Inventor: Haruo Nishiyama, Kyoto, Japan

[73] Assignee: Sharp Kabushiki Kaisha, Osaka, Japan

[21] Appl. No.: 195,948

[22] Filed: May 19, 1988

[30] Foreign Application Priority Data

May 21, 1987 [JP] Japan ................................. 62-124469
May 21, 1987 [JP] Japan ................................. 62-124470

[51] Int. Cl.$^4$ .............................................. H01J 5/16
[52] U.S. Cl. ............................................. 250/227.11
[58] Field of Search .................. 250/227, 214 R, 208, 250/209; 355/41, 68; 350/96.1

[56] References Cited

U.S. PATENT DOCUMENTS 4,013,342 3/1977 Norodny ............................ 250/227
4,517,456 5/1985 Halsall et al. ...................... 250/227
4,599,908 7/1986 Sheridan et al. ................... 250/227
4,651,074 3/1987 Wise ................................... 250/227

Primary Examiner—David C. Nelms

[57] ABSTRACT

A copying apparatus, a printer or the like is internally provided with a state detecting arrangement for detecting a light emitting state or the brightness of a plurality of locations in the apparatus. The state detecting arrangement includes a plurality of optical fibers having respective ends positioned at a plurality of locations to be detected so that standard levels of light to be received at the other ends of the optical fibers may be different from one another. The arrangement further includes at least one light receiving element for simultaneously receiving light emitted from the other ends of the optical fibers and at least one circuit for judging the state of each location on the basis of a detection level of the light receiving element.

6 Claims, 5 Drawing Sheets

ARRANGEMENT FOR DETECTING A STATE OF LIGHT OR BRIGHTNESS

BACKGROUND OF THE INVENTION

1. Field of the Invention

The present invention relates to an arrangement for detecting a light emitting state or the brightness of a plurality of locations in a copying apparatus, a printer or the like.

2. Description of the Prior Art

In a copying apparatus, for example, it is necessary to assuredly catch the brightness or light emitting states of a plurality of locations. To this end, the copying apparatus is internally provided with a thermister for detecting the temperature of a fixing device, an optical sensor for detecting the amount of light emitted from a copy lamp, a reed switch for detecting the presence or absence of a copy paper sheet or for the detecting the position thereof, and the like. A plurality of signals indicative of the states of these various portions are led to a circuit board constituting a control circuit by way of a plurality of lead wires.

However, processes to be executed in the copying apparatus necessitate a high-voltage discharge and the amount of light emitted from the copy lamp is regulated by the phase control. These facts produce a certain noise at a high level and a noise signal undesirably enters a signal line such as a lead wire or the like, for example, by magnetic induction. This noise signal is sometimes erroneously detected in the conventional copying apparatus. In addition, static electricity produced outside of the apparatus body occasionally causes another erroneous detection. Accordingly, the conventional copying apparatus needs a plurality of noise filters in a circuit for detecting the state or a program for repeatedly detecting the signal within a given period of time to serve as a filter.

Otherwise, it has been considered to utilize optical fibers so that the apparatus may not be subjected to the noise caused by the magnetic induction. In this case, however, a plurality of relatively expensive photoelectric elements and a plurality of conversion circuits must be inevitably provided for respective locations to be detected, thus resulting in that the state detecting arrangement cost is undesirably high.

Furthermore, a detection level varies in compliance with the state of each location to be detected. If the states of a plurality of locations are detected in a relatively wide range in detection level and when it is necessary to assuredly catch even a fine change, the detecting circuit becomes complicated or is lowered in its performance.

SUMMARY OF THE INVENTION

Accordingly, the present invention has been developed with a view to substantially eliminating the above described disadvantages inherent in the prior art state detecting arrangement, and has for its essential object to provide an improved state detecting arrangement which is hardly affected by any noise and is relatively low in production cost.

Another important object of the present invention is to provide a state detecting arrangement of the above described type which is capable of assuredly detecting the states of a plurality of locations, even if detection levels vary largely at these locations to be detected.

A further object of the present invention is to provide a state detecting arrangement of the above described type which is simple in construction and stable in functioning.

In accomplishing these and other objects, a state detecting arrangement for detecting a light emitting state or the brightness of a plurality of locations in a copying apparatus or the like is provided, according to one preferred embodiment of the present invention, with a plurality of optical fibers having respective ends positioned at a plurality of locations to be detected so that standard levels of light to be received at the other ends of the optical fibers may be different from one another. The state detecting arrangement of the present invention is further provided with at least one light receiving means for receiving light emitted from the other ends of the optical fibers and at least one state judging means for judging the state of each location on the basis of a detector level of the light receiving means.

In the state detecting arrangement of the present invention, the light receiving means simultaneously receives light emitted from a plurality of optical fibers. The ends of the optical fibers are positioned at a plurality of locations to be detected so that standard levels of light to be received at the other ends of the optical fibers may be different from one another. Accordingly, the detection level of the light receiving means is definitely determined in accordance with the state of each location. The state judging means judges the state of each location on the basis of the detection level of the light receiving means.

In another aspect of the present invention, a plurality of the optical fibers are gathered at their respective ends into a plurality of groups. The amount of light sent through one optical fiber is substantially close to that sent through another optical fiber in the same group. Furthermore, one light receiving means and one state judging means are provided for each group of optical fibers.

Accordingly, the state judging means can be enhanced in judging performance or the detection level of the light receiving means can be raised in resolving power, thus resulting in that it becomes possible to assuredly detect the state of each location.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
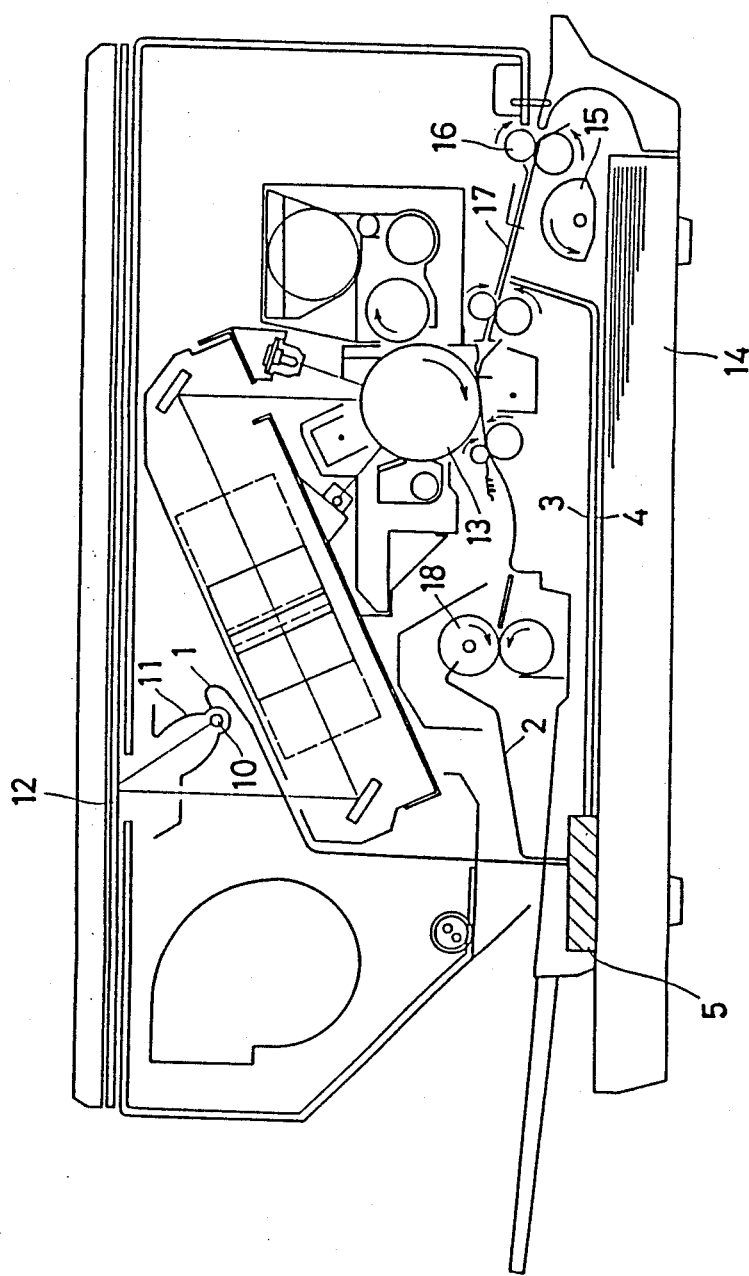
FIG. 1 is a sectional schematic diagram of a copying apparatus employing therein a state detecting arrangement according to a first embodiment of the present invention.

FIG. 1 depicts a copying apparatus employing therein a state detecting arrangement according to a first embodiment of the present invention. The copying apparatus is internally provided with four optical fibers 1, 2, 3 and 4, each of which has one end disposed in the vicinity of a location to be detected with optical fibers 1, 2, and 3 each having a respective other end facing a light receiving element provided on a circuit board 5 and with optical fiber 4 having its other end facing a light emitting element 19 (not shown) provided on circuit board 5. One end of the optical fiber 1 is directed to a suitable portion of a reflector 11 for receiving light from a copy lamp 10 which emits light towards a document platform 12. One end of the optical fiber 2 is located in the vicinity of a heater lamp provided at a central portion of a fixing roller 18 for heating a paper sheet on which a toner image is transferred and for applying pressure thereto. One end of the optical fiber 3 is located at a suitable portion of a transport path 17 along which each copy paper sheet 14 is transported towards a photoreceptor drum 13 by means of a feed roller 15 and a pair of transport roilers 16. The optical fiber 4 leads light to be applied to the copy paper sheet being transported along the transport path 17. When the copy paper sheet exists on this transport path 17, the light reflected from the surface of the paper sheet enters the optical fiber 3 from its one end. Accordingly, both the optical fibers 3 and 4 adjoin or are arranged side by side in the apparatus. Although standard levels of light to be received from the second ends of the optical fibers 1 to 3 are different from one another in accordance with the kind of light emitting locations, the ends of the optical fibers 1 to 3 are so located as to render respective standard levels of light received thereby different from one another in a predetermined relation ship as described hereinafter.

Figure 2:
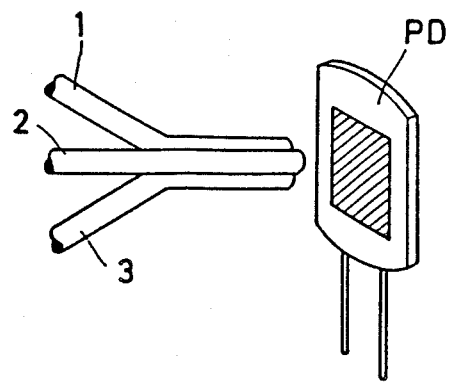
FIG. 2 is a fragmentary perspective view of a plurality of optical fibers opposed at their respective ends to a signal light receiving element.

FIG. 2 illustrates a positional relationship between the other ends of the optical fibers 1 to 3 and the light receiving element. As shown in FIG. 2, the optical fibers 1 to 3 are tied at their other ends in a bundle and directed to a light receiving surface of the light receiving element in the vicinity thereof, with the light receiving element being a photodiode (silicon blue cell) PD. Accordingly, the photodiode PD receives the total amount of light emitted from the other ends of three optical fibers 1 to 3.

Figure 3:
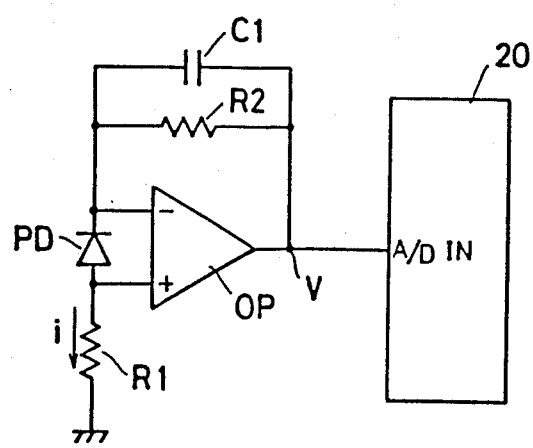
FIG. 3 is a circuit including a light detecting circuit for detecting the amount of light and a state judging circuit for judging the state of each location to be detected.

FIG. 3 depicts a circuit including a light detecting circuit employing therein the aforementioned photodiode PD for detecting the amount of light received thereby and a state judging circuit for judging the state of each location to be detected.

As shown in FIG. 3, the photodiode PD is connected at its anode to a non-inverting input terminal of an operational amplifier OP and is grounded through a resistor R1. The photodiode PD is further connected at its cathode to an inverting input terminal of the operational amplifier OP. A capacitor C1 and another resistor R2 are connected in parallel between an output terminal and the inverting input terminal of the operational amplifier OP. The capacitor C1 is provided for working this circuit as a low pass filter. An analog signal outputted from the operational amplifier OP is inputted into the state judging circuit 20.

Hereupon, when the electric current running in the photodiode PD and the output voltage of the operational amplifier OP are represented by (i) and (V), respectively, the following relationship can be obtained:

$$V = i(R1 + R2).$$

In this way, the current running in the photodiode PD is converted into the voltage and inputted into the state judging circuit 20. The state judging circuit 20 judges the state of each location in accordance with a code signal obtained upon A/D conversion of a signal inputted thereinto.

The relationship between the state of each location shown in FIG. 1 and the output voltage (V) of the operational amplifier OP shown in FIG. 3 will be described with reference to FIG. 4.

Figure 4:
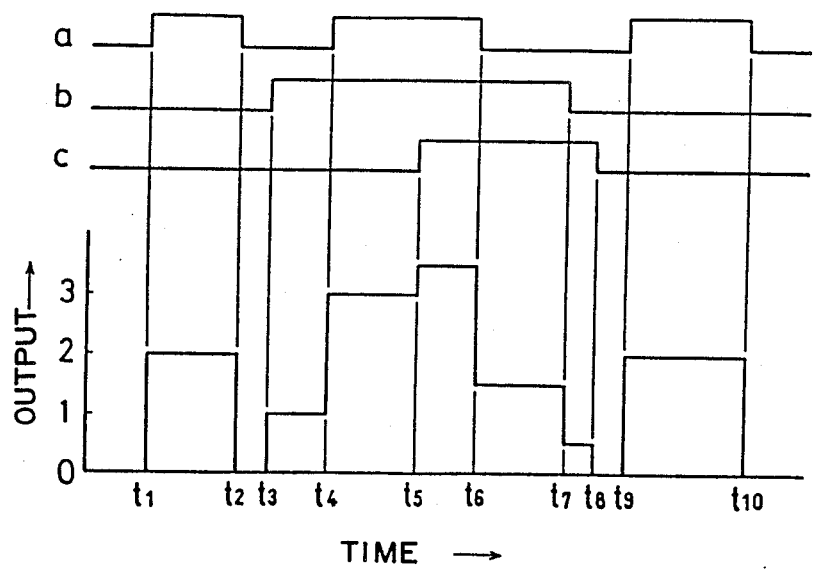
FIG. 4 is a time-chart showing the relationship between the state of each location to be detected and an output level from the light detecting circuit shown in FIG. 3.

In FIG. 4, reference characters (a), (b) and (c) represent the state of the heater lamp, that of the copy lamp and whether or not the copy paper sheet is being transported along the transport path 27. The photodiode PD receives the amount of light in the ratio of 2:1:0.5, when the heater lamp is on, when the copy lamp is on and when the copy paper sheet is being transported.

In is to be noted that reference characters t1 to t10 used in FIG. 4 represent the following timings, respectively.

t1: The heater lamp is turned on.

t1-t1: The heater lamp is kept on and turned off when its temperature has become a predetermined one at the timing t2. In this event, if the heater lamp is not turned off, or if it is abnormal in brightness, such a condition can be detected by a detection level of the photodiode PD. Accordingly, the heating operation can be brought to a stop at an early stage.

t3: Copying is initiated at the timing t2 and the copy lamp is turned on at the timing t3. The amount of light can be detected by the detection level on this occasion.

t4-t5: Both the heater lamp and the copy lamp are kept on during this period. The detection level is a value obtained by adding the level shown by (a) and that shown by (b).

t5-t6: The detection level further increases by the fact that the copy paper sheet is being transported along the transport path.

t6-t7: Only the heater lamp is turned off at the timing t6 and kept toff during this period.

t7-t8: The copy lamp is turned off at the timing t7 and kept off during this period.

t8: The copy paper sheet passes through the transport path, resulting in that the detection level becomes zero.

t9-10: Only the heater lamp is kept on during this period.

As described above, the state of each located can be judged in accordance with the detection level of the light receiving element.

Figure 5:
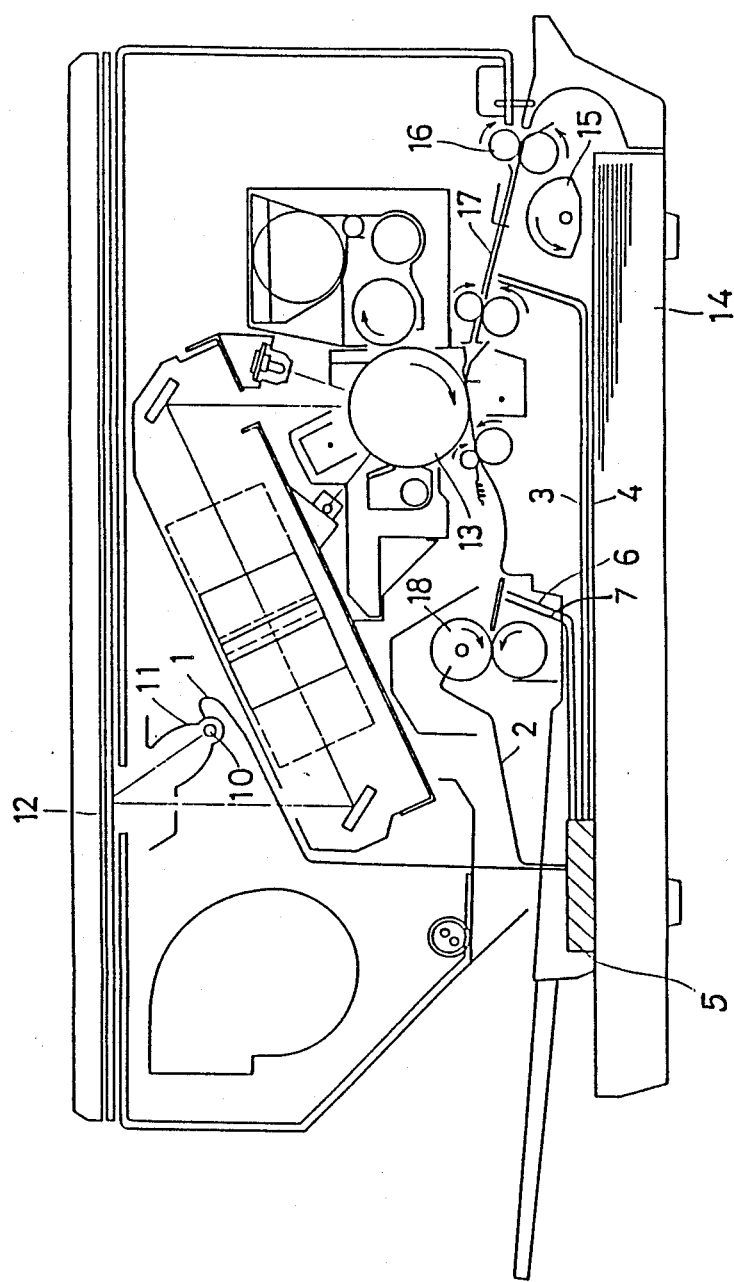
FIG. 5 is a diagram similar to FIG. 1, of a copying apparatus employing therein a state detecting arrangement according to a second embodiment of the present invention.

With reference to FIG. 5, the state detecting arrangement according to a second embodiment of the present invention will be explained hereinafter.

The copying apparatus employing therein the state detecting arrangement according to the second embodiment of the present invention accommodates six optical fibers 1 to 4 6 and 7. That is to say, in this embodiment, two optical fibers 6 and 7 are additionally provided in the copying apparatus employing therein the state detecting arrangement according to the first embodiment of the present invention. One end each of optical fibers 6 and 7 are disposed in the vicinity of an inlet portion of the fixing rollers 18. When any copy paper sheet exists in this portion, light sent through the optical fiber 6 from light emitting source 19 provided on circuit board 5 is applied to the copy paper sheet and the light reflected thereby enters the optical fiber 7 from its one end.

Even in this embodiment, it is considered that four optical fibers 1, 2, 3 and 7 are so tied at their respective ends in a bundle as to face a single light receiving element so that the state of each location can be detected on the basis of the amount of light received by the light receiving element.

Figure 6:
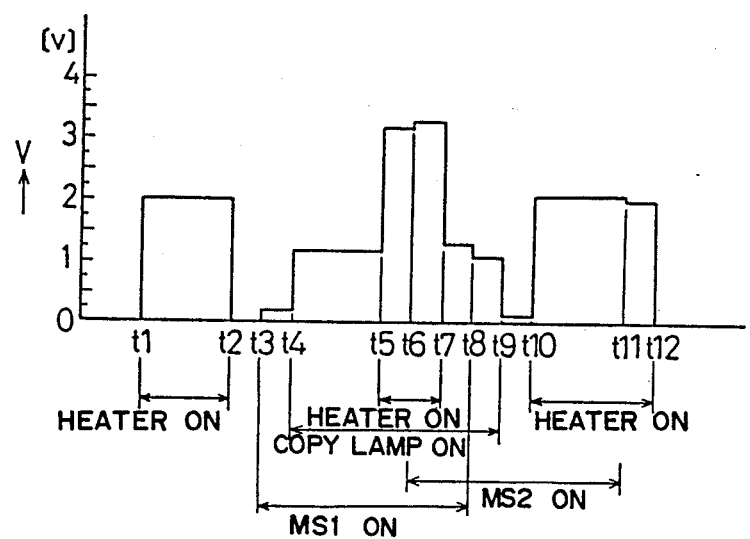
FIG. 6 is a time-chart explanatory of the effect of the state detecting arrangement according to the second embodiment of the present invention.

FIG. 6 is a time-chart showing one variation of the detection level of the light receiving element in the case where the states of four locations are detected, the heater lamp, the copy lamp, a paper charge switch MS1 and a paper discharge switch MS2. When the heater lamp, the copy lamp, the switch MS1 and the switch MS2 are on, the detection levels are 2V, 1V, 0.2V and 0.1V, respectively. Accordingly, the detection level varies in compliance with the state of each location to be detected. As in this case, if the states of a plurality of locations are detected in a relatively wide range in detection level and when it is necessary to catch even a fine change, the detecting circuit becomes complicated or is lowered in its performance.

Under such circumstances, it is not preferable to tie a plurality of optical fibers in a bundle so that the amount of light sent therethrough may be directed to a single light receiving element, as in the first embodiment.

Because of this, in the state detecting arrangement according to the second embodiment of the present invention, the optical fibers 1 and 2 are led to one light receiving element and the other two optical fibers 3 and 7 are led to another one.

Figure 7:
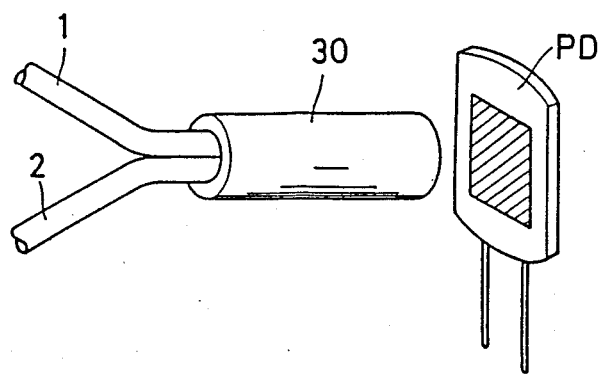
FIG. 7 is a view similar to FIG. 2, according to the second embodiment of the present invention.

In FIG. 7, two optical fibers 1 and 2 are tied at their respective ends in a bundle by means of a tie member 30 so as to face the light receiving surface of the first light receiving element of a photodiode PD in the vicinity thereof. Accordingly, the photodiode PD receives the total amount of light emitted from the ends of the optical fibers 1 and 2.

Likewise, the other two optical fibers 3 and 7 are so tied at their respective ends in a bundle as to face the second light receiving element of another photodiode PD in the vicinity thereof.

In this embodiment, two of the circuits shown in FIG. 3 are independently provided for respective photodiodes PD.

Figure 8:
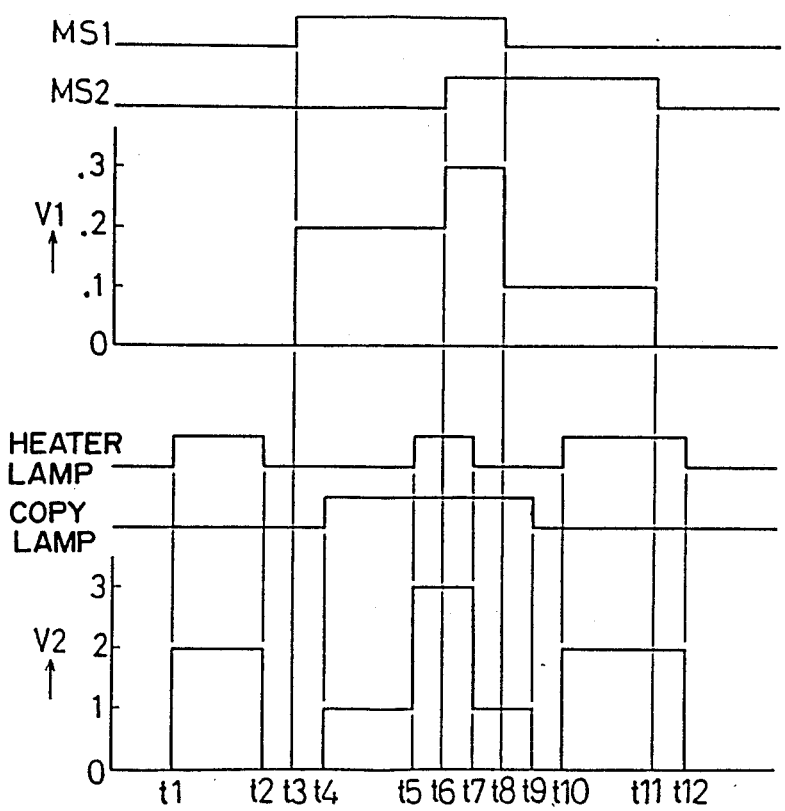
FIG. 8 is a time-chart similar to FIG. 4, according to the second embodiment of the present invention.

FIG. 8 is a time-chart showing the relationship between the state of each location to be detected and output voltages V1 and V2 of two operational amplifiers OP.

In FIG. 8, reference characters MS1 and MS2 are signals indicative of whether or not the optical fibers 3 and 7 have received the light. The first light receiving element receives the amount of light in the ratio of 2:1, when the copy paper sheet exists on the transport path 17 and the switch MS1 is on, and when the copy paper sheet exists in the vicinity of the fixing rollers 18 and the switch MS2 is on. V1 represents the level of light received by the first light receiving element. The second light receiving element receives the amount of light in the ratio of 2:1, when the heater lamp is on and when the copy lamp is open. V2 represents the level of light received by the second light receiving element.

It is to be noted that reference characters t1 to t12 used in FIG. 8 represent the following timings, respectively.

t1: The heater lamp is turned on.

t1-t2: The heater lamp is kept on and the level V2 becomes 2. When the temperature of the heater lamp has become the predetermined one at the timing t2, the heater lamp is turned off. In this event, the copying operation starts.

t3: The copy paper sheet is supplied along the transport path. The switch MS1 is turned on and the level V1 becomes 2.

t4: The copy lamp is turned on and the level V2 becomes 1.

t5: The heater lamp is again turned on by virtue of the function of temperature control by the fixing rollers. The level V2 becomes 3 by adding the level at the time when the heater lamp is turned on to the level at the time when the copy lamp is kept on.

t6: The switch MS2 is turned on. Accordingly, the level V1 becomes 3 and this value is obtained by adding the level at the time when the switch MS2 is turned on to the level at the time when the switch MS1 is kept on.

t7: The heater lamp is turned off and V2 becomes 1 again.

t8: Upon transportation of the copy paper sheet, its trailing end passes through the optical fiber 3 so that the switch MS1 is turned off. Accordingly, the level V1 becomes 1.

t9: The copy lamp is turned off and the level V2 becomes zero.

t10: The heater lamp is turned on again by virtue of the function of temperature control by the fixing rollers.

t11: The copy paper sheet to which a toner image has been transferred passes through the fixing rollers to be discharged therefrom, resulting in that the switch MS2 is turned off and the level V1 becomes zero.

t12: The heater lamp is turned off and the level V2 becomes zero again.

As described above, the state of each location can be judged on the basis of the detection level of the two light receiving elements.

As is clear from the above, according to the present invention, since a plurality of optical fibers transmit optical signals indicative of the states of a plurality of locations to the light receiving elements, the state detecting arrangement of the present invention is hardly affected by any noise resulting from magnetic induction or the like. Moreover, it is not necessary to provide a plurality of photoelectric converting elements at respective locations to be detected, and therefore, any undesirable heat is hardly generated at these locations.

In the first embodiment of the present invention, a plurality of optical fibers are so tied in a bundle as to face a single light receiving element so that the state of each location may be judged by the detection level of the light receiving element. Accordingly, a circuit required for detecting the state of each location becomes simple and the arrangement of the present invention can be employed in a certain relatively inexpensive apparatus.

If the states of a plurality of locations are detected in a relatively wide range in detection level and when it is necessary to catch even a fine change, a plurality of optical fibers can be gathered into two or more groups as in the second embodiment of the present invention. In this case, the amounts of light sent through the optical fibers in the same group are rendered substantially close to one another. Furthermore, one light receiving element and one state judging means are provided for each group of the optical fibers. The circuit required for detecting the state of each location can be simplified by using a relatively small number of the light receiving elements. Even when the amount of light largely varies in accordance with the kind of light emitting portions at respective locations, it is possible to assuredly detect the state of each location.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A state detecting arrangement for detecting a light emitting state or the brightness of a plurality of predetermined locations, the arrangement comprising:
   a plurality of optical fibers having respective first ends positioned at a plurality of locations to be detected so that levels of light output at respective second ends of said optical fibers may be different from one another;
   at least one light receiving means for simultaneously receiving light emitted from the second ends of each said plurality of optical fibers; and
   at least one means for judging said light emitting state of brightness of each of said plurality of locations on the basis of a detection level at said light receiving means.

2. The state detecting arrangement as claimed in claim 1, wherein said light receiving means includes a photodiode.

3. The state detecting arrangement as claimed in claim 1, wherein a plurality of said optical fibers are gathered at their respective ends into a plurality of groups and one light receiving means an one means for judging are provided for each group of said optical fibers, whereby the amounts of light sent through said optical fibers in the same group is substantially close to one another.

4. A state detecting arrangement for detecting a light emitting state or the brightness of a plurality of predetermined locations in an image forming apparatus, the arrangement comprising;
   a plurality of optical fibers having respective first ends thereof positioned at a plurality of locations within said image forming apparatus to be detected so that levels of light output at respective second ends of said optical fibers may be different from one another in a predetermined relationship according to the location detected within said apparatus;
   at least one light receiving means for simultaneously receiving light emitted from the second ends of each of said plurality of optical fibers; and
   at least one means for judging said light emitting state or brightness of each of said plurality of locations according to a detected level of said light emitting state or brightness for each of said plurality of optical fibers at said light receiving means.

5. The state detecting arrangement as claimed in claim 4, wherein one of said plurality of optical fibers has its first end positioned adjacent a copy paper transport path within said image forming apparatus.

6. The state detecting arrangement as claimed in claim 4, wherein one of said plurality of optical fibers has its first end positioned in the vicinity of a heater lamp within said image forming apparatus.

* * * * *